United States Patent
Yoneyama

(10) Patent No.: US 12,397,620 B2
(45) Date of Patent: Aug. 26, 2025

(54) WIND DIRECTION ADJUSTMENT APPARATUS

(71) Applicant: NIHON PLAST CO., LTD., Fujinomiya (JP)

(72) Inventor: Yojiro Yoneyama, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 315 days.

(21) Appl. No.: 17/991,944

(22) Filed: Nov. 22, 2022

(65) Prior Publication Data

US 2023/0166582 A1 Jun. 1, 2023

(30) Foreign Application Priority Data

Nov. 30, 2021 (JP) ................................. 2021-194126

(51) Int. Cl.
*B60H 1/34* (2006.01)

(52) U.S. Cl.
CPC ... *B60H 1/3421* (2013.01); *B60H 2001/3478* (2013.01)

(58) Field of Classification Search
CPC ...................... B60H 1/3421; B60H 2001/3478
USPC ........................................................ 454/155
See application file for complete search history.

(56) References Cited

U.S. PATENT DOCUMENTS

| | | | | |
|---|---|---|---|---|
| 5,599,230 A * | 2/1997 | Naruse | ................. | B60H 1/3421 |
| | | | | 454/155 |
| 6,131,336 A * | 10/2000 | Krause | ................. | B60H 1/3414 |
| | | | | 49/73.1 |
| 6,533,655 B2 * | 3/2003 | Demerath | ............ | B60H 1/3421 |
| | | | | 454/155 |
| 9,919,586 B2 * | 3/2018 | Belzons | ............... | B60H 1/3421 |
| 10,703,177 B2 * | 7/2020 | Park | ........................ | F24F 13/08 |
| 11,065,939 B2 * | 7/2021 | Lee | ......................... | F24F 11/89 |
| 11,358,441 B2 * | 6/2022 | Morales | ............... | B60H 1/3421 |
| 11,738,624 B2 * | 8/2023 | Castro Ramos | ..... | B60H 1/3421 |
| | | | | 454/155 |
| 2017/0259649 A1 * | 9/2017 | Shibata | ................ | B60H 1/3421 |

FOREIGN PATENT DOCUMENTS

| | | |
|---|---|---|
| JP | 2007-106352 | 4/2007 |
| JP | 2010-089529 | 4/2010 |

* cited by examiner

*Primary Examiner* — Avinash A Savani
*Assistant Examiner* — Dana K Tighe
(74) *Attorney, Agent, or Firm* — Amin, Turocy & Watson, LLP

(57) ABSTRACT

Provided is a wind direction adjustment apparatus achieving improved performance while the number of components is reduced. A wind direction adjustment apparatus 1 includes a case body 3 that internally defines a ventilation passage 5. The wind direction adjustment apparatus 1 includes a fin 15 pivotably disposed in the ventilation passage 5 in the case body 3 to adjust a wind direction in accordance with pivoting. The wind direction adjustment apparatus 1 includes a valve 30 pivotably disposed in a direction intersecting with a pivoting direction of the fin 15 in the ventilation passage 5 in the case body 3, and capable of opening and closing the ventilation passage 5 in accordance with the pivoting. The wind direction adjustment apparatus 1 includes a link 35 that interlocks the pivoting of the valve 30 with the pivoting of the fin 15.

4 Claims, 8 Drawing Sheets

WIND DIRECTION ADJUSTMENT APPARATUS

CROSS REFERENCE TO RELATED APPLICATIONS

The disclosure of Japanese Patent Application No. 2021-194126 filed on Nov. 30, 2021 including the specification, drawings and abstract is incorporated herein by reference in its entirety.

TECHNICAL FIELD

The present invention relates to a wind direction adjustment apparatus including a valve capable of opening and closing a ventilation passage.

BACKGROUND ART

Conventionally, in an air conditioner used in a vehicle such as an automobile, a wind direction adjustment apparatus that adjusts a blowing wind direction is known. The wind direction adjustment apparatus is also called an air-conditioned wind blowing apparatus, an air outlet, a ventilator, or a register. For example, the wind direction adjustment apparatus is installed in various components of the vehicle, such as an instrument panel and a center console part, and contributes to improvement in comfort performance achieved by cooling and heating.

In the wind direction adjustment apparatus configured in this way, there is known an apparatus that includes a fin for adjusting a wind direction and a shut valve for opening and closing a ventilation passage. In the apparatus, the fin is operated to pivot by an operation knob, and the shut valve is operated by an operation dial (for example, refer to PTL 1).

In a case of this configuration, the operation knob and the operation dial are required. Consequently, a mechanism is complicated, layout restrictions are imposed, and design is likely to be impaired.

In addition, in place of the shut valve, a technique is known in which a plurality of fins overlap each other at a maximum swung position to close the ventilation passage (for example, refer to PTL 2).

In a case of this configuration, it is not easy to hold a sealed state of the ventilation passage only by overlapping the fins. This configuration requires a structure in which a surface of the fin is provided with adhesion, or a structure including a mechanism that biases the fin in a pressing direction.

CITATION LIST

Patent Literature

PTL 1
Japanese Patent Application Laid-Open No. 2007-106352 (pages 4 to 6, FIG. 1)
PTL 2
Japanese Patent Application Laid-Open No. 2010-89529 (pages 9 to 10, FIG. 7)

SUMMARY OF INVENTION

Technical Problem

As described above, it is desired to improve performance of the wind direction adjustment apparatus with a simpler configuration.

The present invention is made in view of the above-described circumstances, and an object of the present invention is to provide a wind direction adjustment apparatus achieving improved performance while the number of components is reduced.

Solution to Problem

There is provided a wind direction adjustment apparatus according to claim 1. The wind direction adjustment apparatus includes a case body that internally defines a ventilation passage, a fin disposed in the ventilation passage in the case body to be pivotable to adjust a wind direction in accordance with pivoting, a valve disposed in the ventilation passage in the case body to be pivotable in a direction intersecting with a pivoting direction of the fin, and capable of opening and closing the ventilation passage in accordance with pivoting, and a link that interlocks the pivoting of the valve with the pivoting of the fin.

According to the wind direction adjustment apparatus of claim 2, the wind direction adjustment apparatus of claim 1 further includes an operation section that causes the fin to pivot. The fin may be pivotable in an operation direction of the operation section.

According to the wind direction adjustment apparatus of claim 3 or 4, in the wind direction adjustment apparatus of claim 1 or 2, the link may be movable in a direction along the pivoting direction of the fin. The valve may have a link joining portion joined to the link, and may be caused to pivot by an external force applied to the link joining portion from the link side as the link moves.

According to the wind direction adjustment apparatus of the claims, a plurality of the fins may be disposed in a longitudinal direction of the case body. The valve may be disposed in a longitudinal shape along the longitudinal direction.

Advantageous Effects of Invention

According to the wind direction adjustment apparatus of claim 1, for example, it is not necessary to separately provide the operation section for operating the fins and the operation section for operating the valve. While the number of components can be reduced, sealing of the ventilation passage can be easily held by the valve. Therefore, performance can be improved.

According to the wind direction adjustment apparatus of claim 2, in addition to an advantageous effect of the wind direction adjustment apparatus of claim 1, the fin can be intuitively operated by an operation of the operation section, and the fin can pivot in accordance with the operation of the operation section. The valve can pivot by being interlocked with the fin. The fin and the valve can be operated by using a common operation section. Therefore, a configuration can be simplified.

According to the wind direction adjustment apparatus of claim 3 or 4, in addition to an advantageous effect of the wind direction adjustment apparatus of claim 1 or 2, the pivoting of the valve can be easily interlocked with the pivoting of the fin by the link.

According to the wind direction adjustment apparatus according to the claims, the wind direction adjustment apparatus having a thin shape can be configured.

BRIEF DESCRIPTION OF DRAWINGS

FIG. 3A shows a state where the fin of the wind direction adjustment apparatus is swung to the maximum in one direction, FIG. 3B shows a neutral state of the fin, FIG. 3C shows a state where the fin is swung in the other direction, and FIG. 3D shows a closed state of the valve;

FIG. 8A shows a state where the fin of the wind direction adjustment apparatus is swung to the maximum in one direction, FIG. 8B shows a neutral state of the fin, FIG. 8C shows a state where the fin is swung in the other direction, and FIG. 8D shows a closed state of the valve.

DESCRIPTION OF EMBODIMENTS

Hereinafter, embodiment 1 of the present invention will be described with reference to the drawings.

Figure 4:
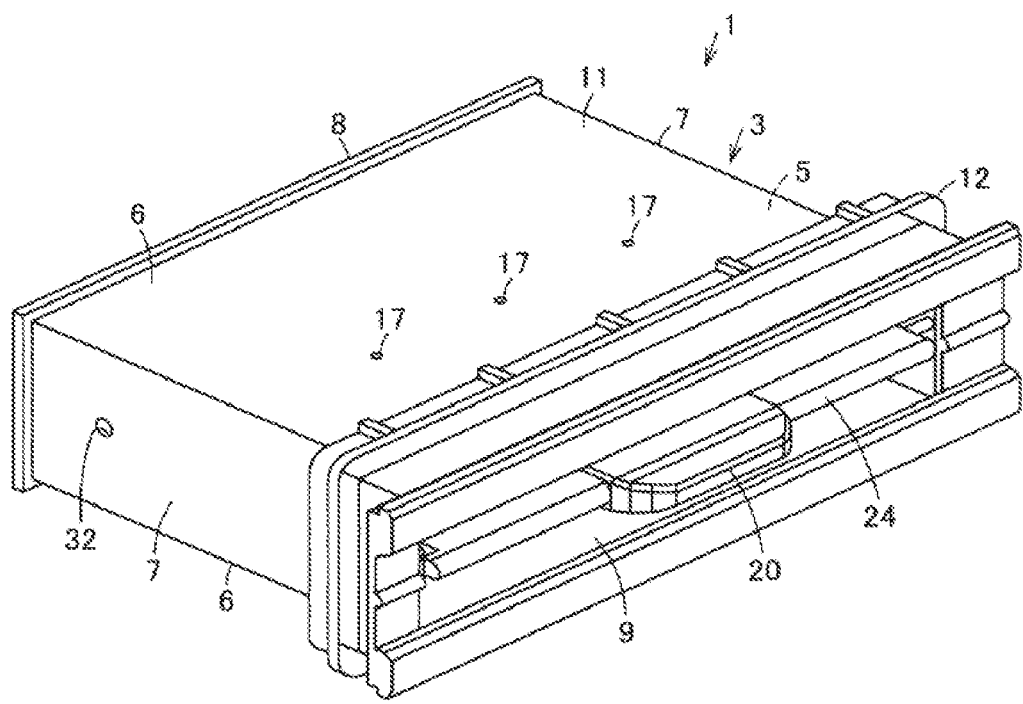
FIG. 4 is a perspective view showing the wind direction adjustment apparatus.

In FIG. 4, a reference number 1 represents a wind direction adjustment apparatus. The wind direction adjustment apparatus 1 is also called an air outlet, a ventilator, or a register, and adjusts a wind blowing direction from an air conditioner. Hereinafter, for more clear description, in the wind direction adjustment apparatus 1, a leeward side from which wind blows will be defined as a front side, a front surface side, or a near side. A side opposite thereto, that is, a windward side which receives the wind will be defined as a rear side, a back side, or a far side. In this manner, a both side direction or a width direction which is a rightward-leftward direction when viewed from the front side, and an upward-downward direction will be defined. In the present embodiment, the wind direction adjustment apparatus 1 is applied to an air conditioner for a vehicle such as an automobile. The wind direction adjustment apparatus 1 may be disposed at any desired position. In the drawings, an arrow FR side will be defined as the front side, an arrow RR side will be defined the rear side, an arrow L side will be defined as a left side, an arrow R side will be defined as a right side, an arrow U side will be defined as an upper side, and an arrow D side will be defined as a lower side. The directions are shown only as examples, and may be changed as appropriate depending on an installation position or an installation orientation of the wind direction adjustment apparatus 1.

The wind direction adjustment apparatus 1 includes a case body 3. The case body 3 is also called a duct. The case body 3 is formed in a cylindrical shape. In the present embodiment, the case body 3 is formed in a cylindrical shape in a forward-rearward direction. In the shown example, the case body 3 is formed in a rectangular cylindrical shape. A ventilation passage 5 is internally surrounded by the case body 3. A direction parallel to a central axis of the case body 3 is a ventilation direction of the ventilation passage 5. In the present embodiment, the ventilation direction of the ventilation passage 5 is the forward-rearward direction, and ventilation is performed from the rear side to the front side. That is, in the ventilation passage 5, the rear side is an upstream side in the ventilation direction, and the front side is a downstream side in the ventilation direction.

The case body 3 has a predetermined length in the ventilation direction of the ventilation passage 5. In the present embodiment, the case body 3 is flat in an upward-downward direction, and is formed in a longitudinal shape in the rightward-leftward direction, that is, in a horizontally long shape. Therefore, the wind direction adjustment apparatus 1 is formed in a horizontally thin shape. The case body 3 integrally has a central portion of the ventilation passage 5, that is, a pair of end wall portions 6 facing each other across the central axis, and a pair of side wall portions 7 joining the pair of end wall portions 6. The pair of end wall portions 6 face each other in the upward-downward direction, and the pair of side wall portions 7 face each other in the rightward-leftward direction. A receiving port 8 for receiving air, that is, air-conditioned wind in the ventilation passage 5, is surrounded by rear end portions of the pair of end wall portions 6 and 6 and the pair of side wall portions 7 and 7. An air outlet 9 for discharging the air-conditioned wind from the ventilation passage 5 is surrounded by front end portions of the pair of end wall portions 6 and 6 and the pair of side wall portions 7 and 7. That is, the rear end portion of the case body 3 serves as the receiving port 8 for receiving the air-conditioned wind into the ventilation passage 5, and the front end portion of the case body 3 serves as the air outlet 9 for discharging the air-conditioned wind from the ventilation passage 5. The ventilation passage 5 allowing communication is formed between the receiving port 8 and the air outlet 9. The air-conditioned wind passes from the receiving port 8 to the air outlet 9. The receiving port 8 and the air outlet 9 respectively have the horizontally long shape.

The case body 3 may be integrally formed, or may be formed by combining a plurality of members. In the present embodiment, the case body 3 has a case main body portion 11 and a finisher 12 which is a design member. The case main body portion 11 is a main body portion forming an upstream side majority of the case body 3. The case main body portion 11 is formed in a rectangular cylindrical shape. The finisher 12 is attached to a front end, that is, a downstream end of the case main body portion 11. The finisher 12 is also called a panel, and forms a portion of the design at an installation position of the wind direction adjustment apparatus 1. The finisher 12 is formed in a rectangular frame shape surrounding the air outlet 9.

Figure 1:
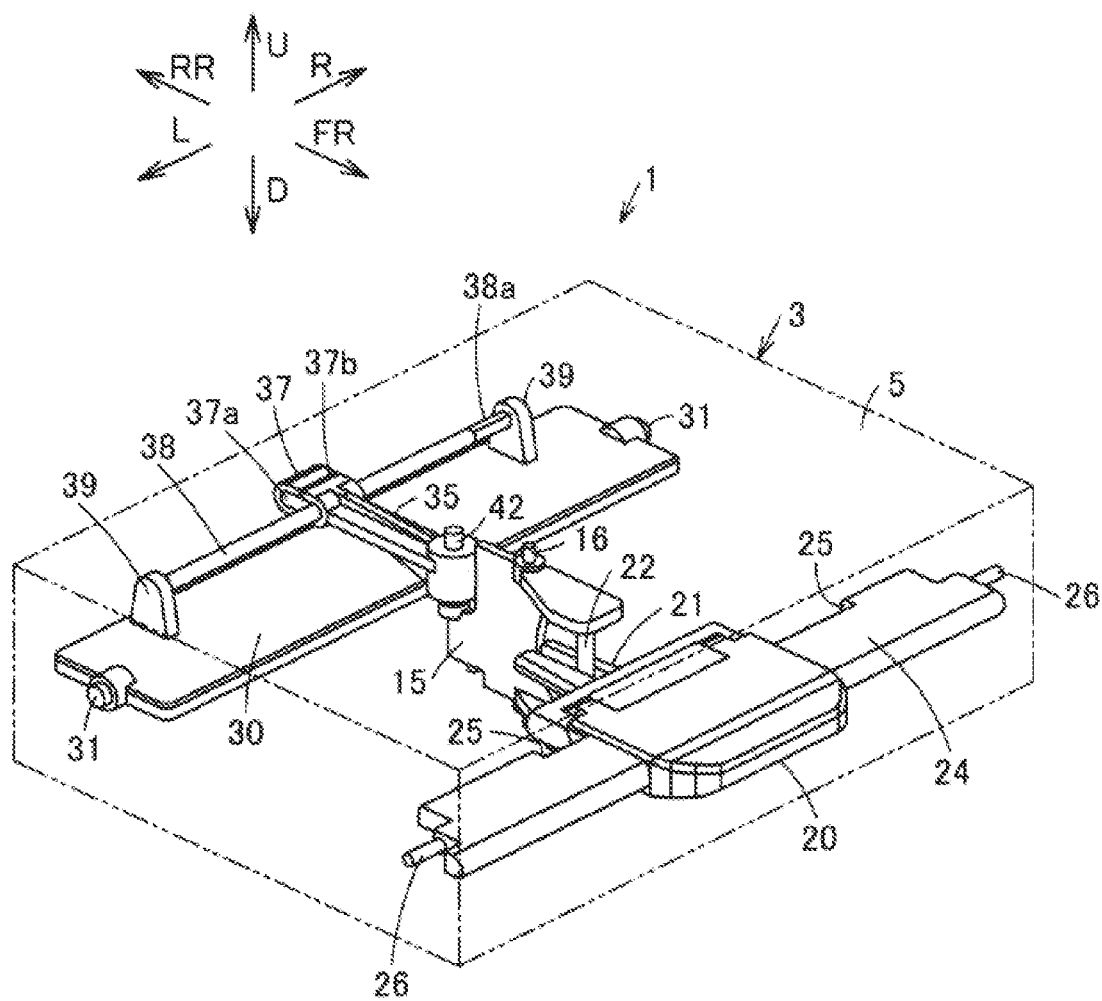
FIG. 1 is a perspective view showing an internal structure of a wind direction adjustment apparatus according to embodiment 1 of the present invention.

As shown in FIG. 1, a fin 15 is disposed inside the case body 3, that is, in the ventilation passage 5. The fin 15 is also called a louver, and pivots with respect to the case body 3, thereby adjusting a wind direction of the air-conditioned wind blowing from the air outlet 9 (FIG. 4) in accordance with the pivoting. The fin 15 is formed in a plate shape in which one main surface and the other main surface serve as flow straightening surfaces. The fin 15 has a pivoting portion 16. The pivoting portion 16 is held to be pivotable by a pivoting receiving portion 17 (FIG. 4) formed in the case body 3. The fin 15 pivots along a longitudinal direction of the case body 3 or the ventilation passage 5 to adjust the wind direction in the longitudinal direction of the case body 3 or the ventilation passage 5. That is, in the present embodiment, the fin 15 has the pivoting portions 16 on upper and lower sides, and each pivoting portion 16 is held to be pivotable by the pivoting receiving portion 17 (FIG. 4) formed on each end wall portion 6 of the case body 3. The fin 15 has flow straightening surfaces on right and left sides, and is pivotable in the rightward-leftward direction. One of the pivoting portion 16 and the pivoting receiving portion 17 (FIG. 4) is a shaft portion, and the other is a hole portion or a recessed portion. In the present embodiment, the pivoting portion 16 is the shaft portion, and the pivoting receiving portion 17 (FIG. 4) is the hole portion having a round hole shape or the recessed portion.

In the present embodiment, the fin 15 is located inside the case main body portion 11 in the case body 3. That is, the fin 15 is located to be separated to an upstream side with respect to the air outlet 9. The pivoting receiving portion 17 is formed in the case main body portion 11.

The number of fins 15 may be one or two or more. In the present embodiment, a plurality of the fins 15 are disposed in the longitudinal direction of the case body 3. Preferably, the plurality of fins 15 are disposed at an equal interval or an approximately equal interval in the longitudinal direction of the case body 3. In the present embodiment, the fin 15 are aligned in the rightward-leftward direction. The plurality of fins 15 are joined by a link member, and configured to pivot in the same direction by being interlocked with each other. In the drawing, for clear description, only one fin 15 disposed in a central portion is shown, and illustration of the other fins 15 is omitted.

Figure 2:
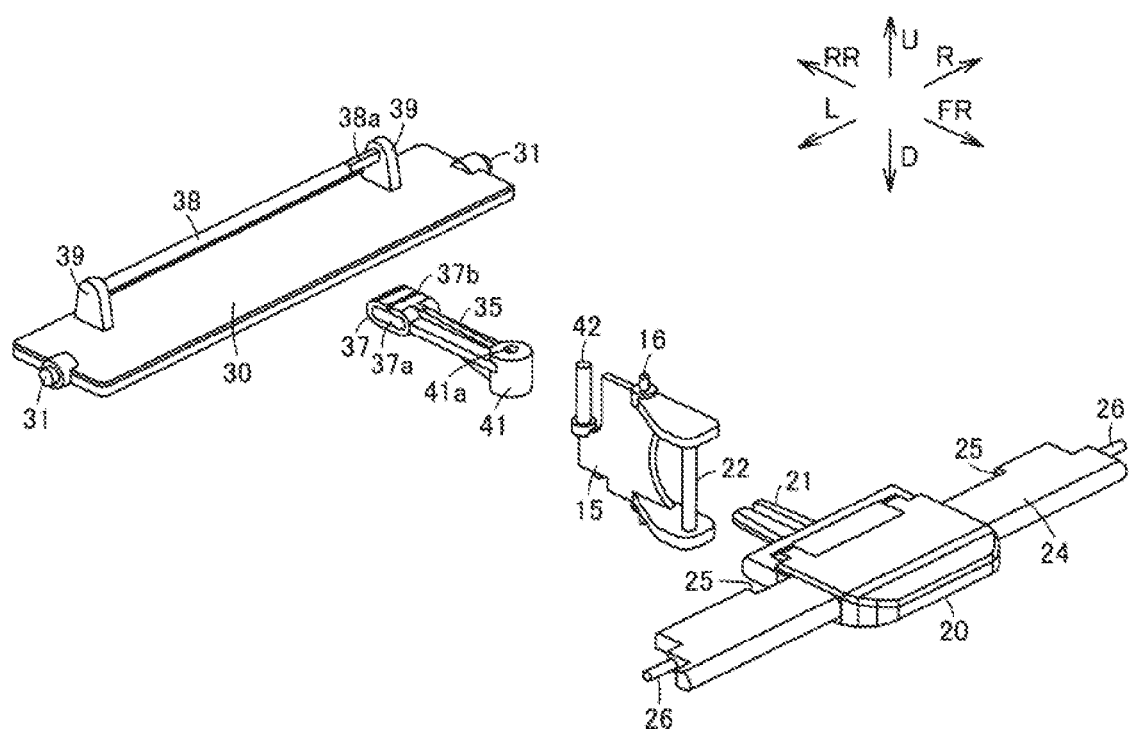
FIG. 2 is an exploded perspective view showing the internal structure of the wind direction adjustment apparatus.

As shown in FIGS. 1 and 2, in the present embodiment, the fin 15 is joined to the operation section 20, and the pivoting of the fin 15 can be directly operated by a user such as an occupant through the operation section 20. When there are the plurality of fins 15, one of the fin 15, preferably the fin 15 in the central portion is joined to the operation section 20. The operation section 20 is an operation knob, and the fin 15 is pivotable in an operation direction of the operation section 20. In the shown example, the operation section 20 is movable in the rightward-leftward direction, and the fin 15 is caused to pivot in the rightward-leftward direction by the movement in the rightward-leftward direction. The operation section 20 is exposed from the air outlet 9 (FIG. 4). In the present embodiment, the operation section 20 is formed in a longitudinally thin shape in the rightward-leftward direction. A joining portion 21 is formed in the operation section 20. The joining portion 21 is joined to a joining receiving portion 22 formed in the fin 15 to be pivotable. One of the joining portion 21 and the joining receiving portion 22 is a shaft portion, and the other is a hole portion or a recessed portion. In the present embodiment, the joining portion 21 is a recessed portion which is long in the forward-rearward direction between a pair of arm portions projecting from a rear portion of the operation section 20 toward the fin 15, and the joining receiving portion 22 is a columnar shaft portion formed parallel or substantially parallel to a pivoting axis in the fin 15.

The operation section 20 is movably attached to a downstream side fin 24 which is an operation guide portion. In the shown example, the operation section 20 is attached to be slidable along the downstream side fin 24. The downstream side fin 24 is also called a downstream side louver. The downstream side fin 24 is formed in a plate shape in which one main surface and the other main surface serve as flow straightening surfaces. The downstream side fin 24 is disposed to have the straightening surface in a direction intersecting with or orthogonal to the fin 15, on the downstream side from the fin 15. In the present embodiment, the downstream side fin 24 is disposed to have the flow straightening surfaces on upper and lower sides. The downstream side fin 24 is disposed in a longitudinal shape along the longitudinal direction of the case body 3. A restriction portion 25 that restricts a movement range of the operation section 20 is formed in the downstream side fin 24. The restriction portion 25 is a stopper portion that does not allow the operation section 20 to move any further by coming into contact with the operation section 20. The restriction portion 25 is formed on a back side of the downstream side fin 24. In the present embodiment, a pivotable range of the fin 15 by the operation section 20 is set by the restriction portion 25 to be wider in the rightward direction than in the leftward direction.

Preferably, the downstream side fin 24 is disposed to be pivotable in the case body 3 in a direction intersecting with or orthogonal to the pivoting direction of the fin 15. The downstream side fin 24 has a pivoting portion 26. The pivoting portion 26 is held to be pivotable by a pivoting receiving portion formed in the case body 3. The downstream side fin 24 pivots along a direction intersecting with or orthogonal to the longitudinal direction of the case body 3 or the ventilation passage 5, thereby adjusting the wind direction in the direction intersecting with or orthogonal to the longitudinal direction of the case body 3 or the ventilation passage 5. In the shown example, the downstream side fin 24 is disposed to be pivotable in the upward-downward direction. That is, in the present embodiment, the downstream side fin 24 has pivoting portions 26 on right and left sides, and each of the pivoting portions 26 is held to be pivotable by a pivoting receiving portion formed in each side wall portion 7 of the case body 3. The downstream side fin 24 has the flow straightening surfaces on upper and lower sides, and is pivotable in the upward-downward direction. One of the pivoting portion 26 and the pivoting receiving portion is a shaft portion, and the other is a hole portion or a recessed portion. In the present embodiment, the pivoting portion 26 is the shaft portion, and the pivoting receiving portion is the hole portion having a round hole shape or the recessed portion. The downstream side fin 24 is pivotable along the movement direction of the operation section 20. That is, the downstream side fin 24 pivots up and down integrally with the operation section 20 as the operation section 20 moves up and down.

In the present embodiment, as shown in FIG. 4, the downstream side fin 24 is located inside the finisher 12 in the case body 3. That is, the downstream side fin 24 is located to face the air outlet 9. The pivoting receiving portion is formed in the finisher 12. In the shown example, one downstream side fin 24 is set in the central portion in the upward-downward direction which is a short direction of the air outlet 9.

In addition, a valve 30 shown in FIGS. 1 and 2 is disposed inside the case body 3, that is, in the ventilation passage 5. The valve 30 is a shut valve that pivots with respect to the case body 3 to open and close the ventilation passage 5 in accordance with the pivoting. The valve 30 is formed in a rectangular plate shape. The valve 30 has an outer shape substantially equal to a cross-sectional shape of the ventilation passage 5. The valve 30 has a valve pivoting portion 31. The valve pivoting portion 31 is held to be pivotable by a valve pivoting receiving portion 32 (FIG. 4) formed in the case body 3. The valve 30 opens and closes the ventilation passage 5 by pivoting in the direction intersecting with the longitudinal direction of the case body 3 or the ventilation passage 5. That is, in the present embodiment, the valve 30 has valve pivoting portions 31 on right and left sides, and each of the valve pivoting portions 31 is held to be pivotable by the valve pivoting receiving portion 32 (FIG. 4) formed in each side wall portion 7 of the case body 3. The valve 30 is pivotable in the upward-downward direction. Therefore, the pivoting direction of the valve 30 intersects with or is orthogonal to the pivoting direction of the fin 15. One of the valve pivoting portion 31 and the valve pivoting receiving portion 32 (FIG. 4) is a shaft portion and the other is a hole portion or a recessed portion. In the present embodiment, the valve pivoting portion 31 is the shaft portion, and the valve pivoting receiving portion 32 (FIG. 4) is the hole portion having a round hole shape or the recessed portion.

The valve 30 is located to be separated to the upstream side with respect to the fin 15. In the present embodiment, the valve 30 is located inside the case main body portion 11 and in the vicinity of the receiving port 8 (FIG. 4) in the case body 3. The valve pivoting receiving portion 32 (FIG. 4) is formed in the case main body portion 11.

The pivoting of the valve 30 is interlocked with the pivoting of the fin 15 via a link 35. The link 35 is directly or indirectly joined to the valve 30 and the fin 15 to be pivotable. In the present embodiment, the link 35 is directly joined to each of the valve 30 and the fin 15 to be pivotable. The link 35 is movable in a direction along the pivoting direction of the fin 15, and is configured to cause the valve 30 to pivot by transmitting an external force to the valve 30 side as the link 35 moves.

The link 35 is formed in a longitudinal shape. The link 35 is disposed in the ventilation passage 5 to have the longitudinal direction in the forward-rearward direction. The link 35 has a rear end portion in which a valve side joining portion 37 joined to the valve 30 side is one end portion. In the present embodiment, the valve side joining portion 37 is directly joined to a link joining portion 38 formed in the valve 30. The valve side joining portion 37 is joined to the link joining portion 38 to be pivotable and movable. The valve side joining portion 37 and the link joining portion 38 form an interlocking portion that interlocks opening and closing of the valve 30 with the pivoting of the fin 15, that is, the operation of the operation section 20. One of the valve side joining portion 37 and the link joining portion 38 is a shaft portion, and the other is a hole portion. The valve side joining portion 37 is formed along the pivoting direction of the fin 15 in a cylindrical shape having a hole portion 37a penetrating in a tangential direction of the pivoting direction of the fin 15 in the present embodiment. The hole portion 37a is formed in a long hole shape in the longitudinal direction of the link 35. A pivoting range (pivoting angle) of the fin 15 in which an external force for causing the valve 30 to pivot is generated by the pivoting of the fin 15, that is, an operation range of the operation section 20 is set according to the length of the hole portion 37a. That is, an opening/closing timing of the valve 30 is set according to the length of the hole portion 37a. The hole portion 37 a is a timing setting portion that sets a timing for interlocking the pivoting of the fin 15 and the pivoting of the valve 30 with each other. Since the hole portion 37a is set, the valve 30 is configured to pivot by being interlocked with the fin 15 when the fin 15 is swung at a predetermined angle or larger. In addition, in the present embodiment, the valve side joining portion 37 has a cutout opening portion 37b through which the hole portion 37a and the outside of the valve side joining portion 37 communicate with each other. The cutout opening portion 37b can join the valve side joining portion 37 and the link joining portion 38 to each other. The cutout opening portion 37b has a slit shape extending in the rightward-leftward direction.

The link joining portion 38 is formed in a longitudinal shape along the longitudinal direction of the valve 30. The link joining portion 38 is formed in an elongated columnar shape or a rod shape. The valve side joining portion 37 of the link 35 is movable along the longitudinal direction of the link joining portion 38, and the link joining portion 38 is pivotable with respect to the valve side joining portion 37. The link joining portion 38 is disposed parallel or substantially parallel to the pivoting axis on a side opposite to the link 35 with reference to the pivoting axis of the valve 30, that is, on the upstream side with respect to the pivoting axis of the valve 30. Both end portions of the link joining portion 38 are fixed to one main surface of the valve 30 by a fixing portion 39. Therefore, the valve 30 pivots in such a manner that a force is applied from the link 35 to the link joining portion 38 in the forward-rearward direction which is an upstream/downstream direction.

In the present embodiment, the link joining portion 38 has a contraction portion 38a in one end portion in the longitudinal direction to be joined to the valve side joining portion 37. The contraction portion 38a is formed to be narrower than other general portions of the link joining portion 38, and can be inserted or press-fitted into the hole portion 37a from the cutout opening portion 37b of the valve side joining portion 37. Preferably, the contraction portion 38a is set outside a movement range of the valve side joining portion 37 of the link 35 with respect to the link joining portion 38.

In addition, the link 35 has a front end portion in which a fin side joining portion 41 joined to the fin 15 side is the other end portion. In the present embodiment, the fin side joining portion 41 is directly joined to a link side joining receiving portion 42 formed in the fin 15. The fin side joining portion 41 is joined to the link side joining receiving portion 42 to be pivotable. One of the fin side joining portion 41 and the link side joining receiving portion 42 is a shaft portion, and the other is a hole portion. In the present embodiment, the fin side joining portion 41 is formed in a cylindrical shape having a hole portion 41a penetrating in a direction parallel or substantially parallel to the pivoting axis of the fin 15, that is, in the direction intersecting with or orthogonal to the pivoting direction of the fin 15. The hole portion 41a has a round hole shape. The link side joining receiving portion 42 is formed in an elongated columnar shape or a rod shape. The link side joining receiving portion 42 is disposed at a position on a side opposite to the joining receiving portion 22 with reference to the pivoting portion 16 of the fin 15. The link side joining receiving portion 42 is formed parallel or substantially parallel to the pivoting axis of the fin 15.

The wind direction adjustment apparatus 1 is disposed by joining the receiving port 8 to an air conditioner. The air-conditioned wind from the air conditioner passes through the ventilation passage 5 from the receiving port 8, is distributed by the fin 15 and the downstream side fin 24, and blows from the air outlet 9.

The wind direction adjustment apparatus 1 of the present embodiment can blow the air-conditioned wind in any desired direction by combining the wind distributed by the fin 15 in the rightward-leftward direction and the wind distributed by the downstream side fin 24 in the upward-downward direction.

First, with regard to the wind distribution in the upward-downward direction, when a user such as an occupant grips the operation section 20 and moves the operation section 20 in the upward-downward direction, the downstream side fin 24 pivots up and down integrally with the operation section 20. In this manner, the air-conditioned wind is straightened in the upward-downward direction along the flow straightening surface of the downstream side fin 24, and blows in the upward-downward direction from the air outlet 9.

With regard to the wind distribution in the rightward-leftward direction, a user such as an occupant grips the operation section 20 and operates the operation section 20 to slide rightward and leftward. In this manner, the fin 15 pivots rightward and leftward. The air-conditioned wind is straightened in the rightward-leftward direction along the flow straightening surface of the fin 15, and blows in the rightward-leftward direction from the air outlet 9.

Figure 3A:
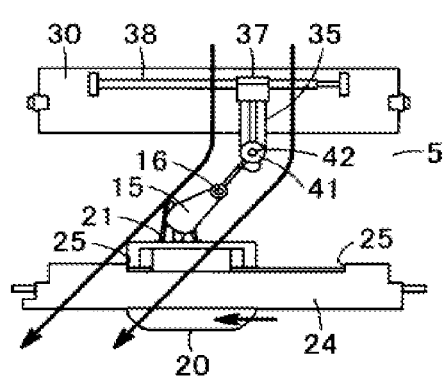
FIGS. 3A to 3D are plan views showing operations of a fin and a valve of the wind direction adjustment apparatus.
Figure 3A:
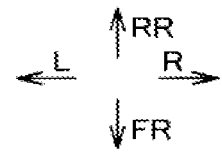
Figure 3B:
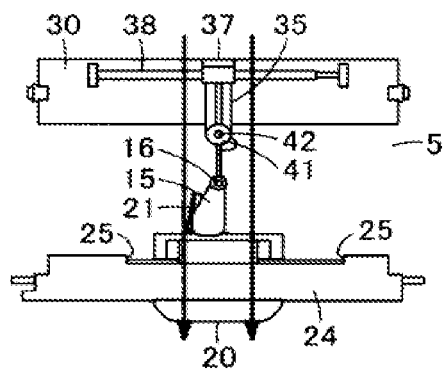
Figure 3B:
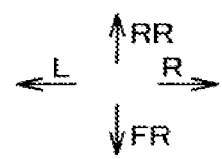

Specifically, as shown in FIG. 3B, when the operation section 20 is located in the central portion of the downstream side fin 24 in the rightward-leftward direction, that is, when the fin 15 is located at a neutral position, the air-conditioned wind straightly flows to the air outlet 9 along the flow straightening surface of the fin 15 inside the ventilation passage 5, and blows in the axial direction of the case body 3, that is, in a front surface direction the ventilation direction of the ventilation passage 5 from the air outlet 9.

In addition, as shown in FIG. 3A, when the operation section 20 is slid leftward along the downstream side fin 24 from the neutral position, the downstream side of the fin 15 joined to the operation section 20 moves leftward, and the fin 15 pivots in a clockwise direction around the pivoting portion 16 in the drawing. FIG. 3A shows a state where the operation section 20 is slid leftward to the maximum by being moved until the operation section 20 comes into contact with the restriction portion 25 on the left side, that is, a state where the fin 15 is swung leftward to the maximum (maximum leftward swing angle position, for example, 35° to the left). Therefore, the air-conditioned wind is straightened in the leftward direction along the flow straightening surface of the fin 15 inside the ventilation passage 5, and blows in the leftward direction from the air outlet 9.

As the fin 15 pivots in the clockwise direction, the link side joining receiving portion 42 also moves in the clockwise direction around the pivoting portion 16. Accordingly, in the link 35 in which the fin side joining portion 41 is joined to the link side joining receiving portion 42, the fin side joining portion 41 pivots in the clockwise direction around the pivoting portion 16, and the valve side joining portion 37 is joined to the link joining portion 38 of the valve 30. In this manner, while maintaining a posture along the forward-rearward direction, the link 35 slides in the rightward direction along the link joining portion 38. In this case, the hole portion 37a of the valve side joining portion 37 has a long hole shape in the forward-rearward direction. Accordingly, over the entire movement range of the link 35, the link 35 does not interfere with the link joining portion 38 of the valve 30 inserted into the hole portion 37a of the valve side joining portion 37 in the forward-rearward direction. Therefore, the valve 30 is not interlocked with the pivoting of the fin 15, and the valve 30 maintains the open state of the ventilation passage 5.

Figure 3C:
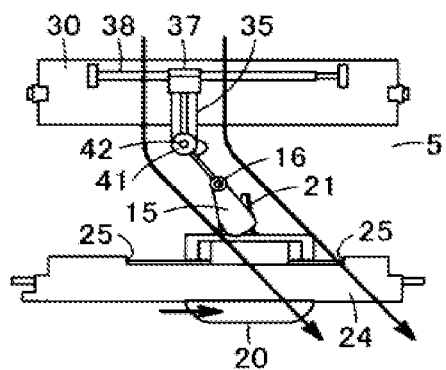
Figure 3C:
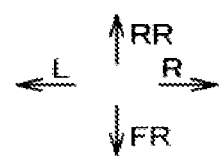

On the other hand, as shown in FIG. 3C, when the operation section 20 is slid rightward along the downstream side fin 24 from the neutral position, the downstream side of the fin 15 joined to the operation section 20 moves rightward, and the fin 15 pivots around the pivoting portion 16 in a counterclockwise direction in the drawing. Therefore, the air-conditioned wind is straightened rightward along the flow straightening surface of the fin 15 inside the ventilation passage 5, and blows in the rightward direction from the air outlet 9.

As the fin 15 pivots in the counterclockwise direction, the link side joining receiving portion 42 also moves in the counterclockwise direction around the pivoting portion 16. Accordingly, in the link 35 in which the fin side joining portion 41 is joined to the link side joining receiving portion 42, the fin side joining portion 41 pivots in the counterclockwise direction around the pivoting portion 16, and the valve side joining portion 37 is joined to the link joining portion 38 of the valve 30. In this manner, while maintaining a posture along the forward-rearward direction, the link 35 slides in the leftward direction along the link joining portion 38. In this case, the hole portion 37a of the valve side joining portion 37 has a long hole shape in the forward-rearward direction. Accordingly, over a predetermined range (for example, a range in which the fin 15 pivots to the right by 35°), the link 35 does not interfere with the link joining portion 38 of the valve 30 inserted into the hole portion 37a of the valve side joining portion 37 in the forward-rearward direction. Therefore, the valve 30 is not interlocked with the pivoting of the fin 15, and the valve 30 maintains the open state of the ventilation passage 5.

Figure 3D:
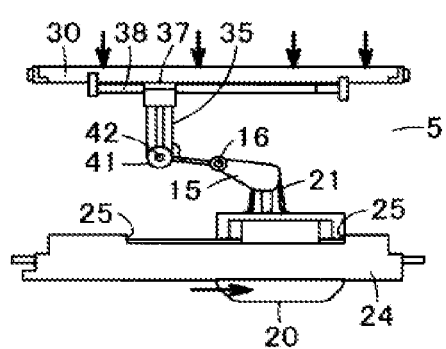
Figure 3D:

As shown in FIG. 3D, when the operation section 20 is further slid rightward along the downstream side fin 24 from a state shown in FIG. 3C, the link 35 further pivots as the fin 15 further pivots. In this manner, the valve side joining portion 37 interferes with the link joining portion 38 of the valve 30 in the forward-rearward direction, and pulls the link joining portion 38 to the downstream side, that is, to the front side. Therefore, the valve 30 pivots by being interlocked with the pivoting of the fin 15, and closes the ventilation passage 5 in accordance with a pivoting angle thereof. FIG. 3D shows a state where the operation section 20 is slid rightward to the maximum by being moved until the operation section 20 comes into contact with the restriction portion 25 on the right side, that is, a state where the fin 15 is swung rightward to the maximum (maximum rightward swing angle position, for example, 82° to the right). At least in this state, the valve 30 is located at a position where the ventilation passage 5 is completely or substantially completely closed.

In this way, according to the embodiment 1, the pivoting of the valve 30 disposed in the ventilation passage 5 in the case body 3 to be pivotable in the direction intersecting with the pivoting direction of the fin 15 is interlocked with the pivoting of the fin 15 disposed in the ventilation passage 5 in the case body 3 to be pivotable. Accordingly, for example, it is not necessary to separately provide the operation section for operating the fin 15 and the operation section for operating the valve 30. While the number of components is reduced, sealing of the ventilation passage 5 can be easily held by the valve 30. Therefore, performance can be improved.

In particular, in the present embodiment, the link 35 is directly joined to the fin 15 and the valve 30. Therefore, a simpler configuration can be adopted, and assembly to the case body 3 is facilitated.

The fin 15 is pivotable in the operation direction of the operation section 20 which causes the fin 15 to pivot. In this manner, the fin 15 can be intuitively operated by the operation of the operation section 20, and when the fin 15 pivots in accordance with the operation of the operation section 20, the valve 30 can pivot by being interlocked with the pivoting of the fin 15. Therefore, the fin 15 and the valve 30 can be operated by the common operation section 20, and thus, the configuration can be simplified.

In addition, in a state where the ventilation passage 5 is closed by the valve 30, the air-conditioned wind does not flow through the ventilation passage 5. Therefore, fin 15 does not need to pivot. Therefore, even in a configuration in which the operation section 20 for causing the fin 15 to pivot is used to interlock the opening and closing of the valve 30, there is no inconvenience when the fin 15 is operated by the operation section 20.

A configuration is adopted in which the link 35 is movable in a direction along the pivoting direction of the fin 15, and the valve 30 is caused to pivot by an external force applied to the link joining portion 38 from the link 35 side as the link 35 moves. In this manner, the pivoting of the valve 30 can be easily interlocked with the pivoting of the fin 15 by the link 35.

In the link 35, the hole portion 37a of the valve side joining portion 37 joined to the link joining portion 38 is formed in a longitudinal shape in the direction intersecting with the longitudinal direction of the link joining portion 38. In this manner, so thin accordance with the length of the hole portion 37a, a timing at which an external force is transmitted from the fin 15 side to the link joining portion 38 of the valve 30 can be set by the link 35. Therefore, an operation amount of the operation section 20 required for the valve 30 to open and close the ventilation passage 5, that is, a swing angle of the fin 15 can be easily adjusted with a simple configuration.

The plurality of fins 15 are disposed in the rightward-leftward direction which is the longitudinal direction of the case body 3, and the valve 30 is disposed in the longitudinal shape along the longitudinal direction. In this manner, the thin wind direction adjustment apparatus 1 having a thin shape can be configured.

In this way, according to the present embodiment, it is possible to provide the wind direction adjustment apparatus 1 having a thin and miniaturized shape, and having a simple design.

Figure 5:
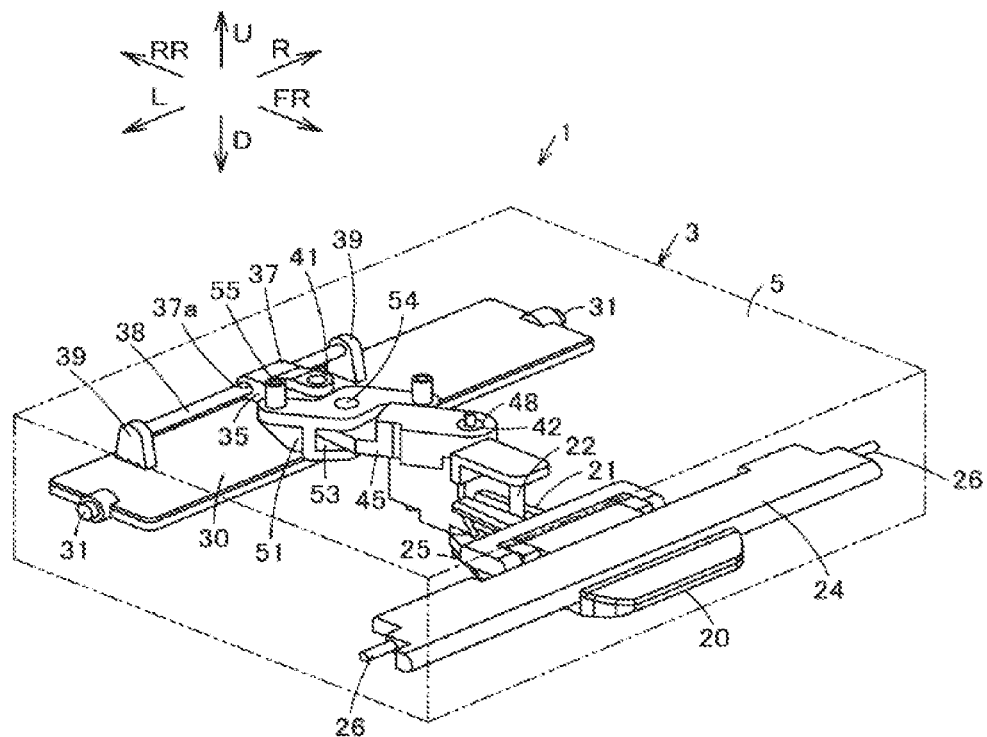
FIG. 5 is a perspective view showing an internal structure of a wind direction adjustment apparatus according to embodiment 2 of the present invention.
Figure 6:
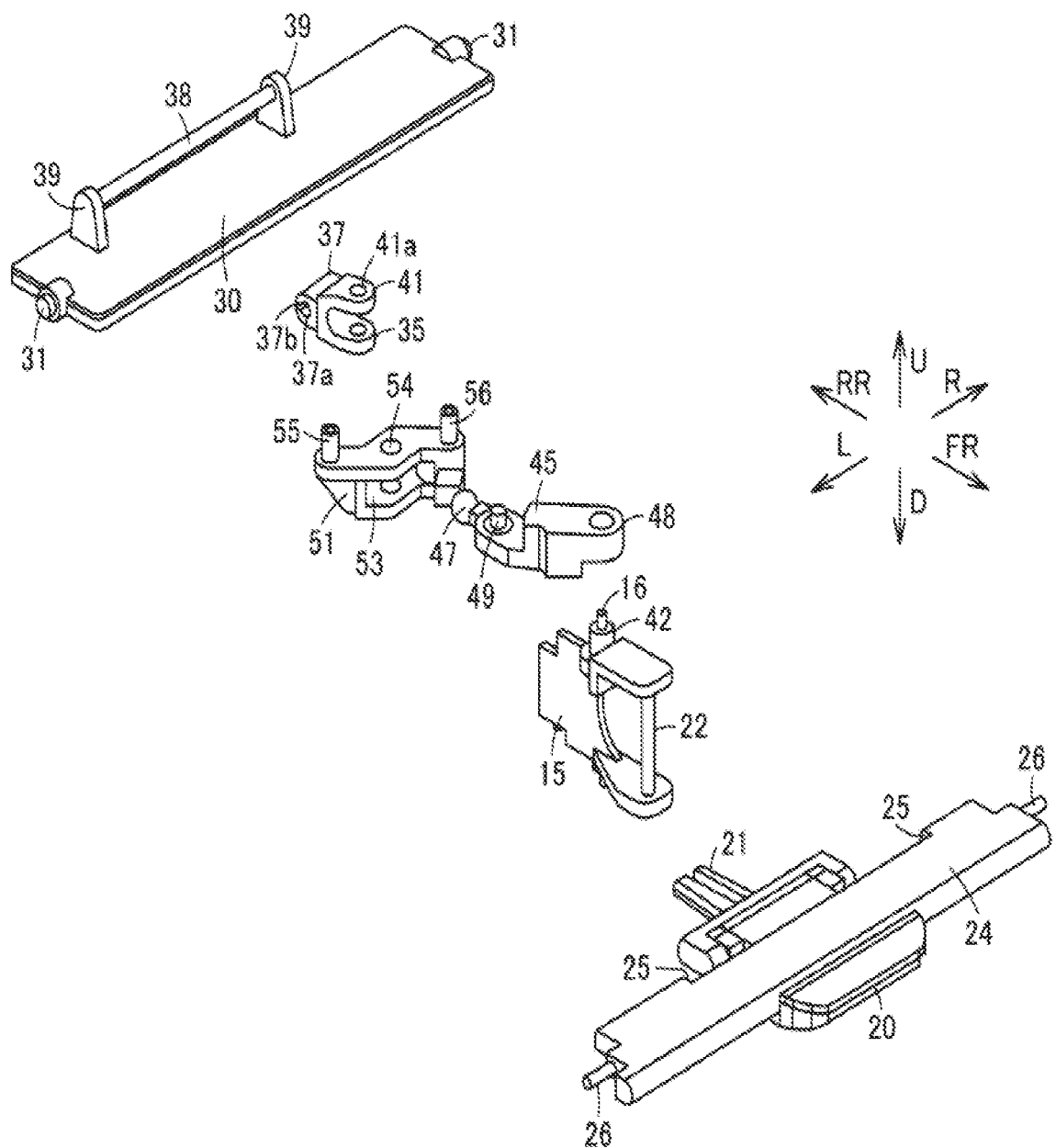
FIG. 6 is an exploded perspective view showing the internal structure of the wind direction adjustment apparatus.
Figure 7:
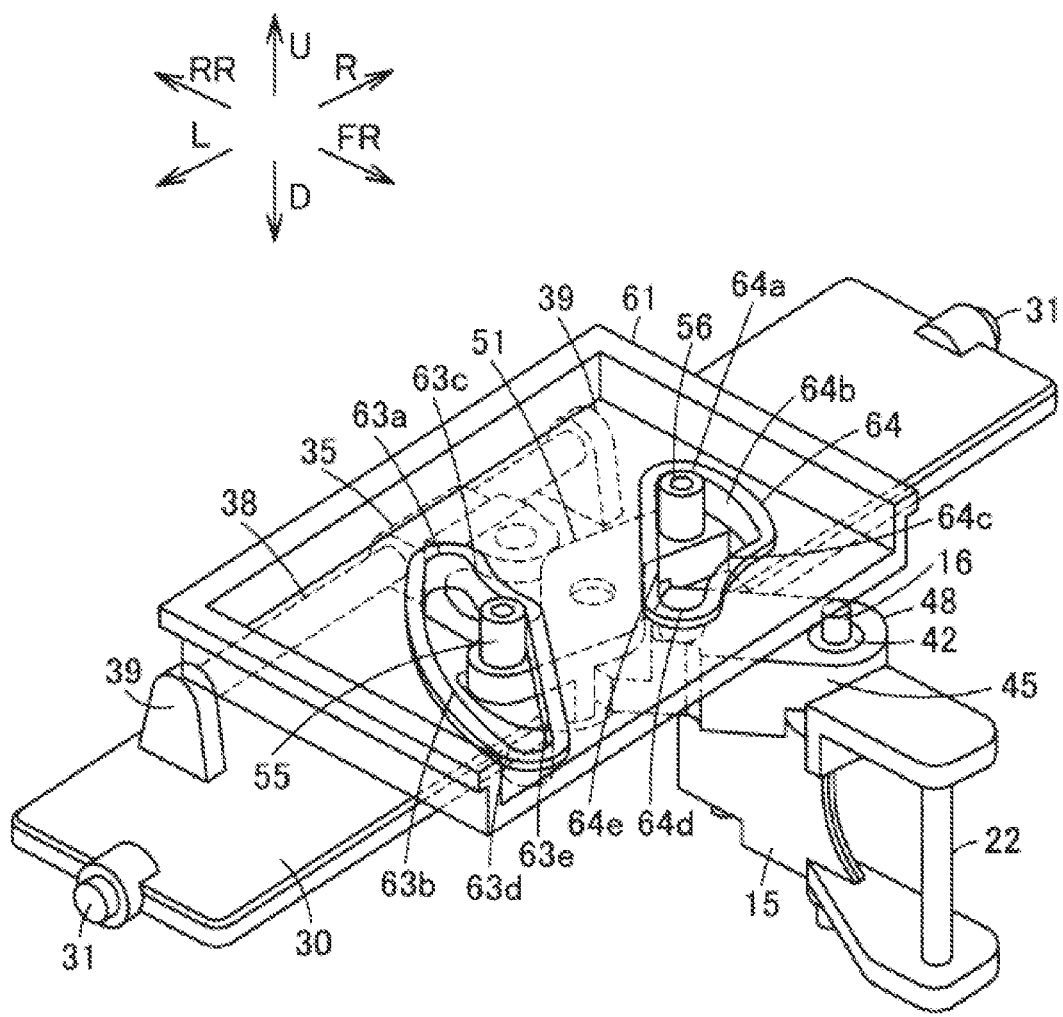
FIG. 7 is a perspective view showing an enlarged part of the internal structure.
Figure 9:
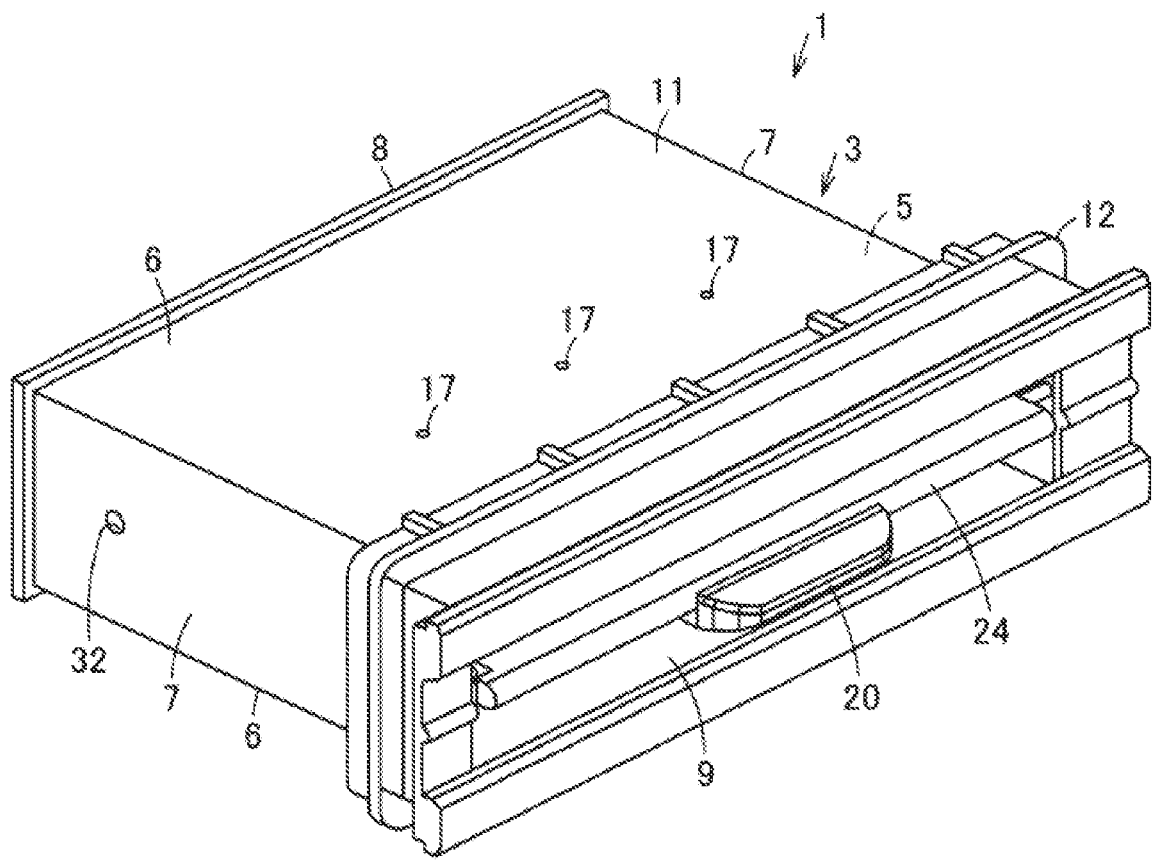
FIG. 9 is a perspective view showing the wind direction adjustment apparatus.

Next, embodiment 2 will be described with reference to FIGS. 5 and 9. The same reference numerals will be assigned to the same configurations and operations as those in the embodiment 1, and description thereof will be omitted.

In the present embodiment, the link 35 is indirectly joined to the fin 15.

In the shown example, in the link 35, the hole portion 37a of the valve side joining portion 37 is formed in a round hole shape which is slightly larger than an outer diameter dimension of the link joining portion 38. In addition, a joint 45 serving as a joining body is joined to the fin side joining portion 41. The link 35 is joined to the fin 15 via the joint 45.

The joint 45 is located in the ventilation passage 5. In the joint 45, a rear end portion serving as one end portion has a first joint joining portion 47 which is a first joining body joining portion joined to the fin side joining portion 41 of the link 35 to be pivotable. One of the fin side joining portion 41 and the first joint joining portion 47 is a recessed portion, and the other is a projecting portion. In the present embodiment, the fin side joining portion 41 is formed as the recessed portion, and the first joint joining portion 47 is formed as the projecting portion having a spherical shape. The fin side joining portion 41 has a hole portion 41a penetrating in the upward-downward direction intersecting with or orthogonal to a penetrating direction of the hole portion 37a of the valve side joining portion 37.

In addition, in the joint 45, a front end portion serving as the other end portion has a second joint joining portion 48 which is a second joining body joining portion joined to the link side joining receiving portion 42 of the fin 15 to be pivotable. One of the link side joining receiving portion 42 and the second joint joining portion 48 is a recessed portion or a hole portion, and the other is a projecting portion or a shaft portion. In the present embodiment, the link side joining receiving portion 42 is formed as the shaft portion having a columnar shape, and the second joint joining portion 48 is formed as the hole portion having a round hole shape. In the shown example, the link side joining receiving portion 42 is located on the pivoting axis of the fin 15. In the present embodiment, the link side joining receiving portion 42 is formed coaxially with the pivoting portion 16. The link side joining receiving portion 42 is located in a base end portion of the pivoting portion 16, and the pivoting portion 16 coaxially protrudes from the link side joining receiving portion 42.

Furthermore, in the joint 45, a cam joining portion 49 is formed between the first joint joining portion 47 and the second joint joining portion 48. With reference to the cam joining portion 49, the first joint joining portion 47 and the second joint joining portion 48 are located on sides opposite to each other. In a plan view, with respect to a virtual line connecting one of the first joint joining portion 47 and the second joint joining portion 48 to the cam joining portion 49, the joint 45 is disposed so that the other of the first joint joining portion 47 and the second joint joining portion 48 is not located on the virtual line. That is, the joint 45 is formed in a curved shape.

A first cam member 51 is attached to the cam joining portion 49. The first cam member 51 has an opening portion 53. The joint 45 is inserted into the opening portion 53, and the first joint joining portion 47 is located on the upstream side with respect to the first cam member 51, that is, on the rear side which is the valve 30 side. The second joint joining portion 48 is located on the downstream side with respect to the first cam member 51, that is, on the front side which is the fin 15 side.

The first cam member 51 has a cam joining receiving portion 54 that receives the cam joining portion 49 to be pivotable. One of the cam joining portion 49 and the cam joining receiving portion 54 is a recessed portion or a hole portion, and the other is a projecting portion or a shaft portion. In the present embodiment, the cam joining portion 49 is the shaft portion having a columnar shape, and the cam joining receiving portion 54 is the hole portion. The cam joining receiving portion 54 is located in the opening portion 53.

In addition, the first cam member 51 has a first cam portion 55 formed in the rear end portion which is one end portion, and a second cam portion 56 formed in the front end portion which is the other end portion. The first cam portion 55 and the second cam portion 56 are located to be separated from each other. The first cam portion 55 and the second cam portion 56 are located on sides opposite to each other with reference to the cam joining receiving portion 54. In the present embodiment, the first cam portion 55 and the second cam portion 56 are shaft portions formed in a columnar shape. The first cam portion 55 and the second cam portion 56 are disposed parallel to each other. The first cam portion 55 and the second cam portion 56 are respectively located in the upper portion of the first cam member 51.

In the present embodiment, the first cam portion 55 is located on the left side of the first cam member 51, and the second cam portion 56 is located on the right side of the first cam member 51.

The first cam portion 55 and the second cam portion 56 are connected to the second cam member 61. The second cam member 61 is located above the first cam member 51 in the ventilation passage 5. The second cam member 61 has a first cam receiving portion 63 and a second cam receiving portion 64 which receive the first cam portion 55 and the second cam portion 56. According to a connection relationship between the first cam portion 55 and the second cam portion 56, and the first cam receiving portion 63 and the second cam receiving portion 64, a position where the joint 45 pivots by being interlocked with the fin 15, that is, a pivoting range (pivoting angle) of the fin 15 in which an external force for causing the valve 30 to pivot is generated by the pivoting of the fin 15, in other words, an operation range of the operation section 20 is set. The first cam member 51 and the second cam member 61 form a timing setting portion that sets a timing for interlocking the pivoting of the fin 15 and the pivoting of the valve 30 with each other.

In the present embodiment, the first cam receiving portion 63 and the second cam receiving portion 64 are cam holes formed in the second cam member 61, and into which the first cam portion 55 and the second cam portion 56 are inserted to restrict positions of the first cam portion 55 and the second cam portion 56. The first cam receiving portion 63 and the second cam receiving portion 64 may pass penetrate the second cam member 61, or may be formed as a recessed portion. In the present embodiment, the first cam receiving portion 63 is located on the left side of the second cam member 61, and the second cam receiving portion 64 is located on the right side of the second cam member 61.

The first cam receiving portion 63 is formed in a long hole shape in the forward-rearward direction. In an inner edge portion of the first cam receiving portion 63, the rear end portion which is one end portion includes a first cam stopper portion 63a. On both sides of the first cam stopper portion 63a, a first guide portion 63b and a second guide portion 63c continuously extend in the forward-rearward direction. A second cam stopper portion 63d is formed in the front end portion of the first guide portion 63b which is the other end portion. The second cam stopper portion 63d and the second guide portion 63c are connected by a continuous portion 63e.

The first cam stopper portion 63a and the second cam stopper portion 63d are stopper portions which receive the first cam portion 55 of the first cam member 51.

The first guide portion 63b and the second guide portion 63c are portions which guide the first cam portion 55 of the first cam member 51 as the first cam member 51 pivots. The first guide portion 63b and the second guide portion 63c are formed to be curved in an arc shape projecting leftward. In the shown example, the first guide portion 63b continuously extends in the forward-rearward direction to the left side of the first cam stopper portion 63a, and the second guide portion 63c continuously extends in the forward-rearward direction to the right side of the first cam stopper portion 63a. The first guide portion 63b extends forward from the second guide portion 63c.

The second cam receiving portion 64 is formed in a long hole shape in the forward-rearward direction. The second cam receiving portion 64 is formed to be shorter in the forward-rearward direction than the first cam receiving portion 63. In the inner edge portion of the second cam receiving portion 64, the rear end portion which is one end portion includes a first cam stopper portion 64a. A first guide portion 64b continuously extends in the forward-rearward direction to the right side which is one side of the first cam stopper portion 64a. A second guide portion 64c continuously extends in the forward-rearward direction to the front end portion of the first guide portion 64b. A second cam stopper portion 64d is formed to continuously extends leftward in the front end portion of the second guide portion 64c which is the other end portion. The second cam stopper portion 64d and the first cam stopper portion 64a are connected by a continuous portion 64e. The first guide portion 64b is formed to be curved in an arc shape projecting rightward. The first guide portion 64b is located concentrically with the second guide portion 63c. The second guide portion 64c is formed in an arc shape projecting rearward.

The first cam stopper portion 64a and the second cam stopper portion 64d are stopper portions which receive the second cam portion 56 of the first cam member 51.

The first guide portion 64b and the second guide portion 64c are portions which guide the second cam portion 56 of the first cam member 51 as the first cam member 51 pivots.

The wind direction adjustment apparatus 1 of the present embodiment can blow the air-conditioned wind in any desired direction by combining the wind distribution of the fin 15 in the rightward-leftward direction and the wind distribution of the downstream side fin 24 in the upward-downward direction in accordance with the operation of the operation section 20. The wind distribution in the upward-downward direction is the same as that in the embodiment 1, and thus, the description will be omitted.

Figure 8A:
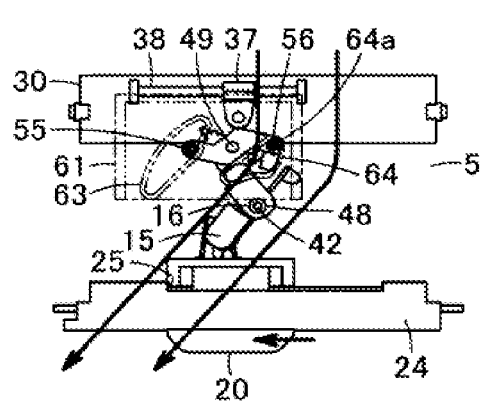
FIGS. 8A to 8D are plan views showing operations of a fin and a valve of the wind direction adjustment apparatus.
Figure 8B:
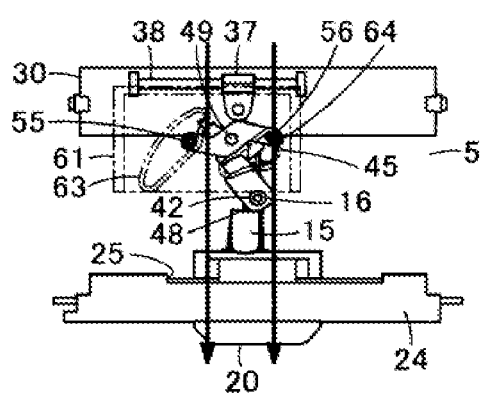

As shown in FIG. 8B, when the operation section 20 is located in the central portion of the downstream side fin 24 in the rightward-leftward direction, that is, when the fin 15 is located at the neutral position, the air-conditioned wind straightly flows to the air outlet 9 along the flow straightening surface of the fin 15 inside the ventilation passage 5. The air-conditioned wind blows in a front surface direction from the air outlet 9 along the axial direction of the case body 3, that is, along the ventilation direction of the ventilation passage 5.

In addition, as shown in FIG. 8A, when the operation section 20 is slid leftward along the downstream side fin 24 from the neutral position, the downstream side of the fin 15 joined to the operation section 20 moves leftward, and the fin 15 pivots in the clockwise direction around the pivoting portion 16 in the drawing. FIG. 8A shows a state where the operation section 20 is slid leftward to the maximum by being moved until the operation section 20 comes into contact with the restriction portion 25 on the left side, that is, a state where the fin 15 is swung leftward to the maximum (maximum leftward swing angle position, for example, 35° to the left). Therefore, the air-conditioned wind is straightened in the leftward direction along the flow straightening surface of the fin 15 inside the ventilation passage 5, and blows in the leftward direction from the air outlet 9.

As the fin 15 pivots in the clockwise direction, the link side joining receiving portion 42 also moves in the clockwise direction around the pivoting portion 16. Accordingly, the joint 45 in which the second joint joining portion 48 is joined to the link side joining receiving portion 42 tends to pivot in the clockwise direction, and the first cam member 51 tends to pivot in the counterclockwise direction. However, the pivoting of the first cam member 51 is restricted since the second cam portion 56 of the first cam member 51 is in contact with the first cam stopper portion 64a of the second cam receiving portion 64 of the second cam member 61. Therefore, the joint 45 held by the cam joining portion 49 serving as a pivoting center with respect to the first cam member 51 relatively pivots in the counterclockwise direction with respect to the downstream side of the fin 15 around the cam joining portion 49. Therefore, the joint 45 maintains the same attitude and the same position as those when the fin 15 is located at the neutral position. In this manner, over the entire movement range, the link 35 does not apply an external force in the forward-rearward direction to the link joining portion 38 of the valve 30 inserted into the hole portion 37a of the valve side joining portion 37. Therefore, the valve 30 is not interlocked with the pivoting of the fin 15, and the valve 30 maintains the open state of the ventilation passage 5.

Figure 8C:
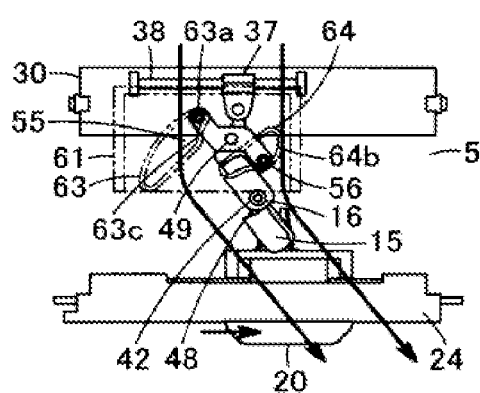

On the other hand, as shown in FIG. 8C, when the operation section 20 is slid rightward along the downstream side fin 24 from the neutral position, the downstream side of the fin 15 joined to the operation section 20 moves rightward, and the fin 15 pivots in the counterclockwise direction around the pivoting portion 16 in the drawing. Therefore, the air-conditioned wind is straightened rightward along the flow straightening surface of the fin 15 inside the ventilation passage 5, and blows in the rightward direction from the air outlet 9.

As the fin 15 pivots in the counterclockwise direction, the link side joining receiving portion 42 also moves in the counterclockwise direction around the pivoting portion 16. Accordingly, the joint 45 in which the second joint joining portion 48 is joined to the link side joining receiving portion 42 tends to pivot in the counterclockwise direction, and the first cam member 51 tends to pivot in the clockwise direction. With regard to the first cam member 51, the first cam portion 55 moves to the first cam stopper portion 63a along the second guide portion 63c of the first cam receiving portion 63 of the second cam member 61. When the second cam portion 56 pivots to move along the first guide portion 64b of the second cam receiving portion 64 of the second cam member 61, and the first cam portion 55 comes into contact with the first cam stopper portion 63a, the pivoting of the first cam member 51 is restricted. Therefore, the joint 45 held by the cam joining portion 49 serving as the pivoting center with respect to the first cam member 51 relatively pivots in the clockwise direction with respect to the downstream side of the fin 15 around the cam joining portion 49. Therefore, the joint 45 maintains the same attitude and the same position as those when the fin 15 is located at the neutral position. In this manner, over the entire movement range, the link 35 does not apply an external force in the forward-rearward direction to the link joining portion 38 of the valve 30 inserted into the hole portion 37a of the valve side joining portion 37. Therefore, the valve 30 is not interlocked with the pivoting of the fin 15, and the valve 30 maintains the open state of the ventilation passage 5.

Figure 8D:
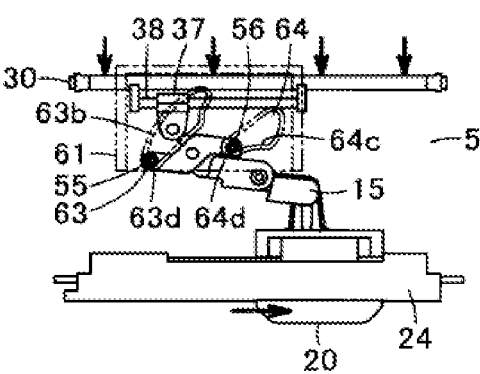

As shown in FIG. 8D, when the operation section 20 is further slid rightward along the downstream side fin 24 from the state shown in FIG. 8C, as the fin 15 further pivots, the first cam portion 55 of the first cam member 51 moves to the second cam stopper portion 63d along the first guide portion 63b of the first cam receiving portion 63 of the second cam member 61, and the second cam portion 56 pivots to move to the second cam stopper portion 64d along the second guide portion 64c of the second cam receiving portion 64 of the second cam member 61. Therefore, the valve side joining portion 37 of the link 35 joined to the joint 45 interferes with the link joining portion 38 of the valve 30 in the forward-rearward direction, and pulls the link joining portion 38 to the downstream side, that is, to the front side. In this manner, the valve 30 pivots by being interlocked with the pivoting of the fin 15, and closes the ventilation passage 5 in accordance with the pivoting angle. FIG. 8D shows a state where the operation section 20 is slid rightward to the maximum by being moved until the operation section 20 comes into contact with the restriction portion 25 on the right side, that is, a state where the fin 15 is swung rightward to the maximum (maximum rightward swing angle position, for example, 82° to the right). At least in this state, the valve 30 is located at a position where the ventilation passage 5 is completely or substantially completely closed.

In this way, according to the embodiment 2, the pivoting of the valve 30 disposed in the ventilation passage 5 in the case body 3 to be pivotable in the direction intersecting with the pivoting direction of the fin 15 is interlocked with the pivoting of the fin 15 disposed in the ventilation passage 5 in the case body 3 to be pivotable. The embodiment 2 has the same configuration as that of the embodiment 1. Accordingly, while the number of components can be reduced, performance can be improved. The embodiment 2 can achieve the same operational effects as those of the embodiment 1.

In addition, the joint 45, the first cam member 51, and the second cam member 61 are used to set the timing at which the external force from the fin 15 side is transmitted to the link joining portion 38 of the valve 30 by the link 35. Therefore, the operation amount of the operation section 20, that is, the swing angle of the fin 15 required for the valve 30 to open and close the ventilation passage 5 can be finely adjusted in accordance with shapes of the first cam receiving portion 63 and the second cam receiving portion 64.

In each of the above-described embodiments, a configuration is adopted in which the valve 30 is interlocked to pivot when the fin 15 is swung in the rightward direction by a predetermined angle or larger. However, without being limited thereto, the disposition or the shape of each portion may be inverted rightward and leftward. In this manner, the valve 30 may be interlocked to pivot when the fin 15 is swung in the leftward direction by a predetermined angle or larger.

In addition, a configuration in which the wind direction adjustment apparatus 1 adopts the horizontal type has been described. However, the wind direction adjustment apparatus 1 can also be configured in the same manner even when a vertical type whose longitudinal direction is the upward-downward direction is adopted. In this case, a configuration is adopted in which the fin 15 is pivotable in the upward-downward direction, and the valve 30 is caused to pivot in the rightward-leftward direction. The disposition of the above-described respective embodiments is rotated by 90° when viewed from the front surface. In this manner, it is possible to achieve the same operational effects as those of the above-described respective embodiments.

Furthermore, the wind direction adjustment apparatus 1 is not limited to an apparatus for an automobile, and may be used for any other desired purpose.

INDUSTRIAL APPLICABILITY

For example, the present invention can be suitably used as a wind direction adjustment apparatus for air conditioning of an automobile.

REFERENCE SIGNS LIST

1 Wind direction adjustment apparatus
3 Case body
5 Ventilation passage
15 Fin
20 Operation section
30 Valve
35 Link
38 Link joining portion

What is claimed is:
1. A wind direction adjustment apparatus comprising:
a case body that internally defines a ventilation passage;

a fin disposed in the ventilation passage in the case body to be pivotable to adjust a wind direction in accordance with pivoting;
a valve disposed in the ventilation passage in the case body to be pivotable in a direction intersecting with a pivoting direction of the fin, and capable of opening and closing the ventilation passage in accordance with pivoting;
a link that interlocks the pivoting of the valve with the pivoting of the fin; and
an operation section that causes the fin to pivot,
wherein the fin is pivotable in an operation direction of the operation section, and
the link is movable in a direction along the operation direction of the operation section that causes the fin to pivot.

2. The wind direction adjustment apparatus according to claim 1,
wherein the link is movable in a direction along the pivoting direction of the fin, and
the valve has a link joining portion joined to the link, and is caused to pivot by an external force applied to the link joining portion from a link side as the link moves.

3. The wind direction adjustment apparatus according to claim 2,
wherein a plurality of the fins are disposed in a longitudinal direction of the case body, and
the valve is disposed in a longitudinal shape along the longitudinal direction.

4. The wind direction adjustment apparatus according to claim 1,
wherein a plurality of the fins are disposed in a longitudinal direction of the case body, and
the valve is disposed in a longitudinal shape along the longitudinal direction.

\* \* \* \* \*